(12) United States Patent
Joseph et al.

(10) Patent No.: US 9,830,325 B1
(45) Date of Patent: Nov. 28, 2017

(54) DETERMINING A LIKELIHOOD THAT TWO ENTITIES ARE THE SAME

(71) Applicant: INTUIT INC., Mountain View, CA (US)

(72) Inventors: Sony Joseph, Mountain View, CA (US); Sunil K. Tripathy, San Jose, CA (US); Ilya A. Izrailevsky, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 644 days.

(21) Appl. No.: 14/024,351

(22) Filed: Sep. 11, 2013

(51) Int. Cl.
*G06F 17/30* (2006.01)

(52) U.S. Cl.
CPC ...... *G06F 17/301* (2013.01); *G06F 17/30303* (2013.01); *G06F 17/30386* (2013.01); *G06F 17/30551* (2013.01)

(58) Field of Classification Search
CPC ...... G06Q 20/04; G06Q 20/10; G06Q 20/385; G06Q 20/40; G06F 17/30303; G06F 17/30386
USPC ....... 707/723, 727, 767, 738, 758, 740, 770, 707/609; 705/30, 35, 38, 39, 44
See application file for complete search history.

(56) References Cited

U.S. PATENT DOCUMENTS

| | | | | |
|---|---|---|---|---|
| 5,991,758 A * | 11/1999 | Ellard | | G06F 17/30321 |
| 6,144,964 A * | 11/2000 | Breese et al. | | 707/758 |
| 6,295,533 B2 * | 9/2001 | Cohen | | G06F 17/30566 |
| 7,403,942 B1 * | 7/2008 | Bayliss | | G06F 17/30303 707/748 |
| 7,418,560 B2 * | 8/2008 | Wintergerst | | G06F 12/084 711/147 |
| 7,490,092 B2 * | 2/2009 | Sibley | | G06F 17/3002 |
| 7,526,486 B2 * | 4/2009 | Cushman, II | | G06F 17/30303 |
| 7,596,632 B1 * | 9/2009 | Vo | | H03M 7/30 709/246 |
| 7,657,540 B1 * | 2/2010 | Bayliss | | G06Q 10/10 707/609 |
| 7,672,833 B2 * | 3/2010 | Blume | | G06F 17/278 704/10 |
| 7,698,163 B2 * | 4/2010 | Reed | | G06Q 30/02 703/2 |
| 7,725,421 B1 * | 5/2010 | Gedalius | | G06Q 40/02 707/609 |
| 7,822,750 B2 * | 10/2010 | Duchon et al. | | 707/738 |
| 7,827,108 B2 * | 11/2010 | Perlman et al. | | 705/44 |
| 7,908,159 B1 * | 3/2011 | Ordonez | | G06Q 10/063 705/7.33 |
| 7,912,842 B1 * | 3/2011 | Bayliss | | G06F 17/30303 707/749 |
| 7,925,652 B2 * | 4/2011 | Merz et al. | | 707/727 |

(Continued)

*Primary Examiner* — Frantz Coby
(74) *Attorney, Agent, or Firm* — Patterson + Sheridan, LLP

(57) ABSTRACT

The disclosed embodiments provide a system that determines a likelihood that a first entity and a second entity are the same entity. During operation, the system obtains financial data related to the first entity and obtains financial data related to the second entity. Next, the system determines the likelihood that the first entity and the second entity are the same entity based on the relationship between the financial data for the first entity and the financial data for the second entity. Then, the system alters a record related to the first entity or the second entity based on the likelihood.

19 Claims, 4 Drawing Sheets

(56) References Cited

U.S. PATENT DOCUMENTS

| | | | | |
|---|---|---|---|---|
| 8,001,153 B2 * | 8/2011 | Skurtovich, Jr. | ...... | G06Q 40/02 707/791 |
| 8,170,953 B1 * | 5/2012 | Tullis et al. | ...................... | 705/39 |
| 8,175,889 B1 * | 5/2012 | Girulat, Jr. | ............ | G06Q 30/01 705/1.1 |
| 8,234,302 B1 * | 7/2012 | Goodwin | ................ | G06F 21/10 707/783 |
| 8,266,168 B2 * | 9/2012 | Bayliss | ............ | G06F 17/30303 707/609 |
| 8,290,838 B1 * | 10/2012 | Thakur | .................. | G06Q 40/02 705/35 |
| 8,296,232 B2 * | 10/2012 | Tullis et al. | ..................... | 705/39 |
| 8,316,047 B2 * | 11/2012 | Bayliss | ............ | G06F 17/30303 707/740 |
| 8,396,791 B2 * | 3/2013 | Cotton | ............................ | 705/38 |
| 8,489,600 B2 * | 7/2013 | Hannuksela | ........ | G06F 17/3002 707/736 |
| 8,495,077 B2 * | 7/2013 | Bayliss | ............ | G06F 17/30303 707/609 |
| 8,595,161 B2 * | 11/2013 | Bearman | ................ | G06Q 10/00 706/17 |
| 8,676,838 B2 * | 3/2014 | Bayliss | ............ | G06F 17/30303 707/770 |
| 8,688,690 B2 * | 4/2014 | Brdiczka et al. | ............. | 707/723 |
| 8,924,319 B1 * | 12/2014 | Bearman | ................ | G06Q 10/00 706/17 |
| 2002/0095362 A1 * | 7/2002 | Masand et al. | ................. | 705/35 |
| 2007/0088719 A1 * | 4/2007 | Staniford | .......... | G06F 17/30551 |
| 2011/0197152 A1 * | 8/2011 | Assadollahi | .......... | G06F 3/0482 715/764 |
| 2011/0270864 A1 * | 11/2011 | Mital et al. | ................... | 707/767 |
| 2012/0331134 A1 * | 12/2012 | Lynn | ................. | G06F 17/30533 709/224 |
| 2013/0117278 A1 * | 5/2013 | Martens et al. | ............. | 707/748 |
| 2013/0268458 A1 * | 10/2013 | Ilardi et al. | ................. | 705/36 R |
| 2014/0279263 A1 * | 9/2014 | Liu et al. | ................... | 705/26.63 |
| 2014/0279299 A1 * | 9/2014 | Erenrich | ........................ | 705/30 |
| 2014/0310199 A1 * | 10/2014 | Hardman et al. | ........... | 705/36 R |
| 2015/0006135 A1 * | 1/2015 | Deb | ........................ | G06F 8/34 703/6 |

* cited by examiner

| Customer Transactions 302 | | | | |
|---|---|---|---|---|
| ID | Entity ID | Amount | Customer Location | Customer Industry Cat. |
| 1 | 1 | $33 | 19106 | 1002 |
| 2 | 2 | $21 | 19147 | 1004 |
| 3 | 1 | $500 | 33131 | 1002 |
| 4 | 2 | $27 | 19123 | 1002 |
| 5 | 1 | $18 | 19130 | 1002 |

DETERMINING A LIKELIHOOD THAT TWO ENTITIES ARE THE SAME

BACKGROUND

Related Art

The disclosed embodiments relate to techniques for processing data. More specifically, the disclosed embodiments relate to techniques for determining a likelihood that two entities are the same entity.

Business software such as online accounting, tax or marketing software typically requires users to enter certain profile data for their company as part of the process of using the software. This non-financial data, such as the company name and address, may have to be entered by multiple users at one company as each user uses the software, or by the same user as the user uses different software applications. However, when this profile data is entered by multiple users or in multiple applications, there can be discrepancies in which data is entered and exactly how it is entered. One user may enter the full name and address for the company, while another user may enter a partial name, abbreviations, or may omit parts of the address.

This can result in multiple records with incomplete or inconsistent data being entered for the same company. Furthermore, if one company uses multiple software applications from the same provider, the provider may not recognize the company as a user of the different applications due to variations in the names, addresses, phone number(s), and/or other non-financial data. Some software providers may try to determine which companies in their records represent the same entity by assessing differences in the names, addresses, and telephone numbers for the different entities. Then, based on these differences (e.g., differences in the strings representing these attributes), the software provider may generate a probability that the entities are the same. However, sometimes this process may not provide enough information to reliably ensure, for the desired uses, a high enough probability that two entities are the same.

SUMMARY

The disclosed embodiments provide a system that determines a likelihood that a first entity and a second entity are a same entity. During operation, the system obtains financial data related to the first entity and obtains financial data related to the second entity. Next, the system determines the likelihood that the first entity and the second entity are the same entity based on the relationship between the financial data for the first entity and the financial data for the second entity. Then, the system alters a record related to the first entity or the second entity based on the likelihood.

In some embodiments, the financial data includes financial transactional data.

In some embodiments, the financial data includes at least one of: an industry category; a radius of activity; a vendor industry category; a set of vendor names; a set of customer names; an average transaction size; an average vendor size; an average customer size; an inventory; debits; credits; accounts payable; and accounts receivable.

In some embodiments, determining the likelihood includes determining a distance based on a distance metric between an attribute of financial data for the first entity and the attribute of financial data for the second entity.

In some embodiments, the system determines a distance, based on a distance metric, of each attribute in a set of attributes for a set of financial data for the first entity from the attribute in the set of attributes for the set of financial data for the second entity, wherein the likelihood is further determined based on a weight for each distance metric.

In some embodiments, obtaining the financial data related to the first entity includes obtaining the financial data related to the first entity from financial data associated with a first online application, and obtaining the financial data related to the second entity includes obtaining the financial data related to the second entity from financial data associated with a second online application.

Some embodiments further include obtaining non-financial data related to the first entity and non-financial data related to the second entity, wherein determining the likelihood that the first entity and the second entity are the same entity further includes determining the likelihood based on the non-financial data related to the first entity and the non-financial data related to the second entity.

Some embodiments further include altering the record if the likelihood is greater than or equal to a first likelihood and altering a second record related to the first entity or the second entity if the likelihood is greater than or equal to a second likelihood.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that, in the described embodiments, the computer-readable storage medium does not include non-statutory computer-readable storage mediums such as transmission signals.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

In the following description, we refer to "some embodiments." Note that "some embodiments" describes a subset of all of the possible embodiments, but does not always specify the same subset of embodiments.

Figure 1:
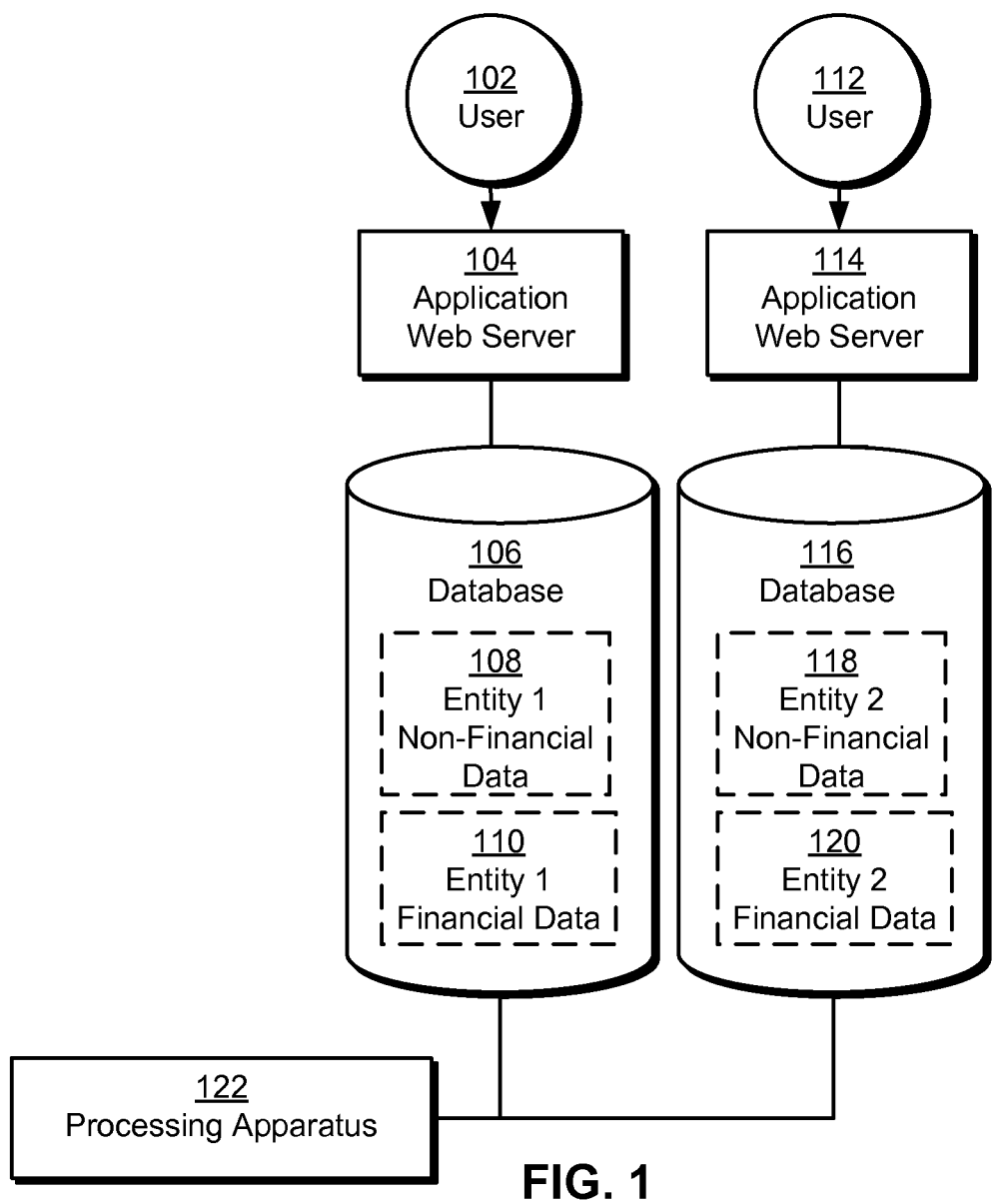
FIG. 1 shows a schematic of a system in accordance with disclosed embodiments.

FIG. 1 depicts a system for determining the likelihood that a first entity and a second entity are the same entity in accordance with described embodiments. User 102 is using an application running on application web server 104 which is connected to database 106. Database 106 contains entity 1 non-financial data 108 and entity 1 financial data 110. User 112 is using an application running on application web server 114 which is connected to database 116. Database 116 contains entity 2 non-financial data 118 and entity 2 financial data 120. Processing apparatus 122 is coupled to both database 106 and database 116.

User 102 and user 112 represent people using application web server 104 and application web server 114, respectively. User 102 is a member of entity 1 (e.g., an employee of or otherwise associated with entity 1), which may be a company, partnership, club, individual, or any other group or organization that includes one or more people. Similarly, user 112 is a member of entity 2, which, as entity 1, may be a company, partnership, club, individual or any other group or organization that includes one or more people. Note that in some embodiments, it is possible that user 102 and user 112 are members of the same entity (e.g., entity 1 and entity 2 are the same), or that user 102 and user 112 are the same user using two different application web servers. Additionally, in some embodiments there may be more than one user from each entity using the associated application web server.

Application web server 104 and application web server 114 can be any type of server or other computer running any type of application including, but not limited to, software for accounting, billing, payroll, taxes, marketing, and may be implemented using a software as a service model. Additionally, users such as user 102 and user 112 may connect with and interact with application web server 104 and application web server 114 using a desktop computer, laptop computer, a subnotebook/netbook, a tablet computer, a cellular phone, a personal digital assistant (PDA), a smartphone, or any other computing device that can communicate and receive data from the application web servers. Additionally, the user computing devices may communicate with the application web servers through a network that may include a local area network (LAN), which may include any combination of one or more wired and/or wireless sections (e.g., including a portion implemented using an 802.11 standard); a wide-area network (WAN), such as the Internet; and/or a cellular network system (e.g., a 3G/4G network such as UMTS, LTE, etc.) or any combination of LANs and WANs.

Database 106 and database 116 may be any type of database implemented using any technology. They may be implemented using one or more discrete storage devices, or stored across a distributed system of storage devices in the same or different physical locations. The logic and control software to store and retrieve data from them may run on processors located in or near them, within the application web server(s), or any combination thereof. Note that in FIG. 1 the databases (e.g., database 106 and database 116) are depicted separately from the application web servers (e.g., application web server 104 and application web server 114). In some embodiments, a database (e.g., database 106) may be physically incorporated in the application web server (e.g., application web server 104), while in some embodiments, the database may be physically separate from the application web server.

Processing apparatus 122 may be any apparatus that includes one or more processing subsystems and may include one or more memory subsystems, such as for storing data and/or instructions for the processing subsystem(s). For example, the memory subsystem(s) can include any type of computer-readable storage medium such as dynamic random access memory (DRAM), static random access memory (SRAM), high capacity mass-storage devices (e.g., magnetic or solid-state drives), and/or other types of memory, and can include mechanisms for controlling access to the memory. Furthermore, one or more of the subsystems of processing apparatus 122 may be located in different physical locations and may be directly connected or networked together using any combination of LANs, and/or WANs. Processing apparatus 122 may be physically located separately from database 106, database 116, application web server 104, and/or application web server 114 and may communicate with them through a direct connection or a networked connection including any combination of one or more LANs and/or WANs. In some embodiments, processing apparatus 122 may be comprised of one or more subsystems included in one or more of database 106, database 116, application web server 104 and/or application web server 114. In some embodiments, processing apparatus 122 may be implemented using any type or any number of computing systems.

Figures 2, 3:
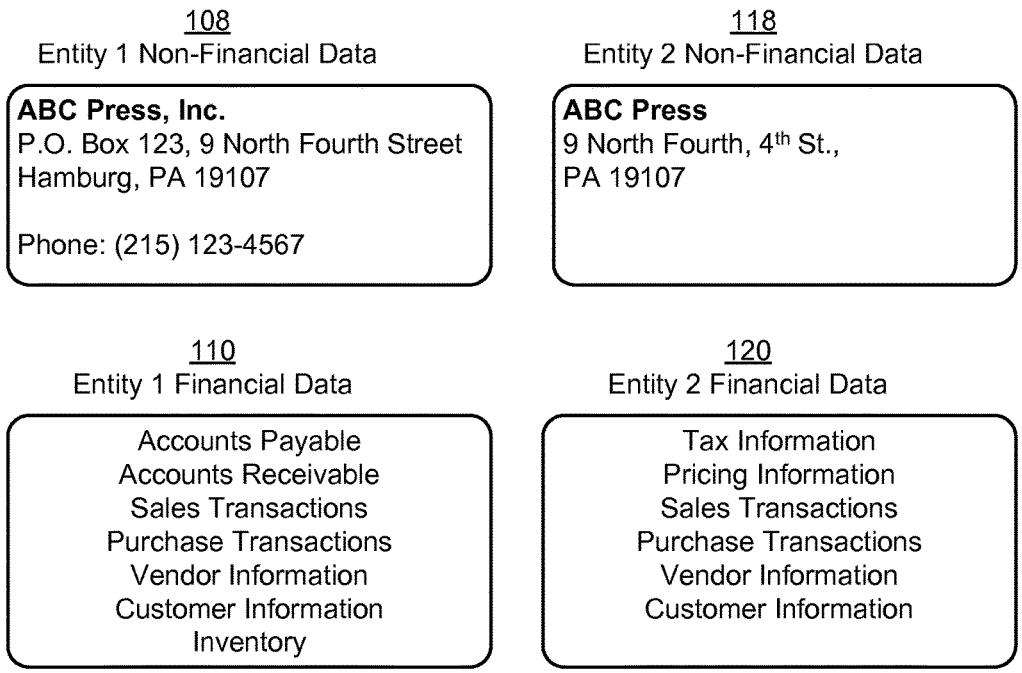
FIG. 2 shows financial data and non-financial data for use by a system in accordance with disclosed embodiments.
FIG. 3 shows exemplary components of customer transaction data in accordance with disclosed embodiments.

FIG. 2 depicts non-financial data and financial data for use by a system in accordance with disclosed embodiments. As depicted in FIG. 2, non-financial data includes the name, address, and phone number of an entity, and may generally include any other data about the entity that is not directly or indirectly financial in nature. Financial data may include but is not limited to an industry category for the entity, a radius of activity for the entity, a vendor industry category, a set of vendor names, a set of customer names, an average transaction size, an average vendor size, an average customer size, an inventory, debits, credits, accounts payable, accounts receivable, spending data, accounting data, tax data, or any other transaction data, and any patterns or other statistical information related thereto.

Examples of categories such data are listed in FIG. 2 for each entity. Note that the categories of entity 1 financial data 110 and entity 2 financial data 120 do not fully overlap. This may be the case when application web server 104 and application web server 114 include different business applications which require users to input different categories of financial data. For example, application web server 104 may include an accounting application, while application web server 114 may include a marketing or tax application.

When user 102 first starts using the application running on application web server 104, user 102 may enter the non-financial data depicted in FIG. 2, including the company name, address, and phone number. Additionally, as user 102 uses the application, the entity 1 financial data depicted in FIG. 2 will be entered. For example, if the application running on application web server 104 is financial accounting software, user 102 may enter data related to accounts payable, accounts receivable, sales and purchase transactions, vendor and customer data, and inventory. Note that in some embodiments other financial data may be entered, while in other embodiments some financial data may be excluded. Additionally, note that vendor and customer data may include, but is not limited to, the name, address, phone number, industry category, and size of the customer or vendor.

Additionally, when user 112 starts using the application running on application web server 114, user 112 may enter entity 2 non-financial data 118 depicted in FIG. 2, including the company name, address and phone number. Additionally, as user 112 uses the application, entity 2 financial data 120 depicted in FIG. 2 will be entered. For example, the application running on application web server 114 may be marketing or tax software, and as user 112 uses the application and enters financial data, data related to taxes, pricing, sales and purchase transactions, and vendor and customer data may be entered. Again, in some embodiments other financial data may be entered, while in other embodiments some financial data may be excluded. As above, the vendor and customer data may include, but is not limited to, the name, address, phone number, industry category, and size of the customer or vendor.

During operation, processing apparatus 122 retrieves financial data for entity 1 from database 106 and financial data for entity 2 from database 116. In some embodiments, processing apparatus 122 may retrieve the data by querying database 106 and database 116 for the data and storing the retrieved data in memory in processing apparatus 122.

Then, all of the data retrieved for entity 1 and entity 2 is segmented into its component signals. FIG. 3 depicts an example of the data related to customer transactions for the 2 entities with a few representative components of the data segmented out. For customer transactions 302, three exemplary components 304 (amount, location (ZIP code) of the customer, and industry category for the customer) are listed for five transactions 306. Note that in some embodiments more or fewer components 304 and more or fewer transactions 306 may be used. Additionally, in some embodiments, other and/or additional financial data may be used, including one or more of the types of data discussed above.

Next, processing apparatus 122 determines the likelihood that entity 1 and entity 2 are the same entity based on the financial data retrieved from database 106 and database 116. In the example of FIG. 3, processing apparatus 122 may determine a characteristic value for each component 304 and then determine a distance between the characteristic values using a distance metric. Then, based on the distance, processing apparatus 122 determines the likelihood that entity 1 and entity 2 are the same entity.

In the example of FIG. 3 for the amount component, processing apparatus 122 may determine the average amount of a customer transaction for each entity and then use the difference in the average amounts as the distance metric for the amount component. Similarly, for the customer location component, processing apparatus 122 may compute an average distance (e.g., in miles) between each entity and its customers and use the difference in the computed averages as the distance metric for the customer location component. Additionally, the distance metrics from multiple categories may be combined to generate a likelihood based on data from any number of desired components. The distance metrics from each component may be combined by determining a coefficient for each component (e.g., a weight) that allows the distance metrics from the components to be combined to generate a likelihood based on more than one component of data.

Note that the likelihood as a function of the determined distances that 2 entities are the same entity can be determined using any desired method including, but not limited to, sampling data from the same or similar databases to determine distances, and then conclusively determining if the entities are, in fact, the same (e.g., through phone calls or other direct methods).

In some embodiments, the entity non-financial data may also be used to determine the likelihood. Along with the use of the entity 1 financial data 110 and entity 2 financial data 120 as discussed above, processing apparatus 122 may also use entity 1 non-financial data 108 and entity 2 non-financial data 118 to determine the likelihood. For example, processing apparatus 122 may determine a difference in the strings between the name of entity 1 ("ABC Press, Inc.) and the name of entity 2 ("ABC Press") by determining a distance between letters in the two names while accounting for known or expected variations such as abbreviations, or the inclusion or exclusion of words such as "Co." or "Inc." The same process may be applied to the address and the phone number. The distances determined by comparing these non-financial data may then be multiplied by their own weights and used in conjunction with the distance and weights found for the financial data to determine a likelihood that the two entities are the same.

In some embodiments, transactional data in the entity financial data is used to determine the likelihood. Transactional data may include, but is not limited to, sales and purchase transactions and the associated customer and vendor data, accounts payable, accounts receivable, or any other financial data that is related to a transaction that includes an entity.

Note that in some embodiments, user 102 and user 112 may both use the same application web server (e.g., application web server 104) and each have their data stored in database 106. In this case, the entity 1 non-financial data and financial data, and the entity 2 non-financial data and financial data would be taken by processing apparatus 122 from the same database to determine the likelihood that they are the same entity.

Processing apparatus 122 may use the determined likelihood for any purpose including, but not limited to, determining which if any data from entity 1 to enter into a record associated with entity 2 (or vice versa), or for any sales, marketing or other business purposes. Furthermore, the action taken by processing apparatus 122 may depend on the value of the likelihood determined by processing apparatus 122. For example, if processing apparatus 122 determines that the likelihood that entity 1 and entity 2 are the same entity is less than 50% but more than 10%, then processing apparatus 122 may alter a record or cause a record to be altered that results in marketing information being sent (or not sent) to both entity 1 and entity 2, and/or offer sales information or discounts (e.g., based on the usage of both application web server 104 and application web server 114). Furthermore, in the case that the likelihood is determined to be greater than a predetermined amount (e.g., 95% or 99%), processing apparatus 122 may cause some data from a record in database 106 for entity 1 to be entered in a record in database 116 for entity 2 (and/or vice versa). For example, if processing apparatus 122 determines with a likelihood of 99.95% that entity 1 and entity 2 are the same entity, then processing apparatus 122 may cause the phone number for entity 1 depicted in FIG. 2 to be entered in the entity 2 non-financial data, along with the P.O. box portion of the address. Additionally, entity 1 financial data, (e.g., inventory) may be entered into entity 2 financial data 120 and vice versa. In some embodiments, processing apparatus 122 may generate the likelihood values which are then used by other apparatuses or systems to update and/or change records as discussed above, or to perform or cause to be performed any other actions, including actions not related to the databases.

Figure 4:
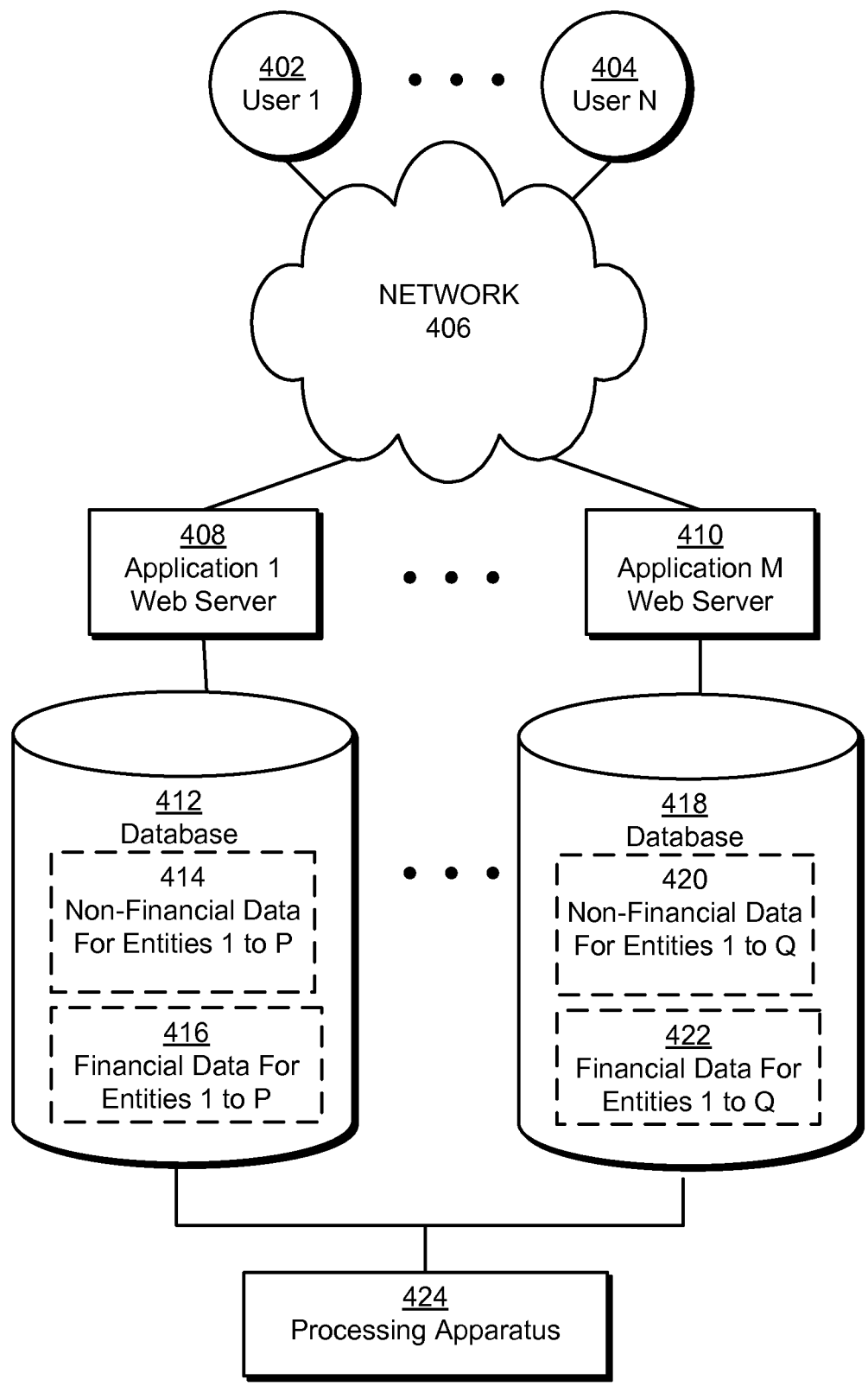
FIG. 4 shows a schematic of a system with multiple users, application web servers, and databases in accordance with disclosed embodiments.

FIG. 4 depicts a number of users from multiple entities using a variety of applications in accordance with described embodiments. In FIG. 4, N users (only user 1 402 and user N 404 are depicted) are coupled through network 406 to M application web servers (only application 1 web server 408 and application M web server 410 are depicted). Each application web server is connected to a database which includes non-financial data and financial data for the entities using the associated application web server. As depicted, application 1 web server 408 is connected to database 412 which includes non-financial data for entities 1 to P 414 (e.g., the P entities using application 1 web server 408) and financial data for entities 1 to P 416. Application M web server 410 is connected to database 418 which includes non-financial data for entities 1 to Q 420 (e.g., the Q entities using application M web server 410) and financial data for entities 1 to Q 422. Processing apparatus 424 is coupled to each database.

Users 402 through 404 represent users from each of the entities using the M application web servers represented by application 1 web server 408 through application M web server 410. Note that there may be any number of users using each of the application web servers, and each user may access one or more application web servers using one or more different computing devices connected to network 406. The computing devices may include, but are not limited to, a desktop computer, a laptop computer, a subnotebook/netbook, a tablet computer, a cellular phone, a personal digital assistant (PDA), a smartphone, or any other computing device that can communicate and receive data through a network to and from an application web server.

Network 406 may be any network implemented in any protocol that can communicate data from one or more computing devices used by users 402 through 404. Network 406 may include, but is not limited to, any combination of LANs and/or WANs, each of which may include one or more wired or wireless portions implemented in any technology.

Application 1 web server 408 through application M web server 410 may be implemented using technology similar to that used to implement application web server 104 or application web server 114 above. In some embodiments, one or more applications may run on more than one application web server, and an application web server may run on multiple physical machines (e.g., servers or other computing systems), and the applications may include, but are not limited to, software for accounting, billing, payroll, taxes, marketing, and may be implemented using a software as a service model.

Databases 412 through 414 may be similar to databases 106 and 116, and may be any type of database implemented using any technology. Each of the databases 412 through 416 stores non-financial and financial data of each of the entities that use the application web server associated with the database. For example, database 412 stores non-financial data for entities 1 to P 414 and financial data for entities 1 to P 416, while database 418 stores non-financial data for entities 1 to Q 420 and financial data for entities 1 to Q 422. Processing apparatus 424 is coupled to each of the databases 412 through 418 and may be implemented using the same or similar technology as processing apparatus 122.

As the N users (e.g., user 1 402 through user N 404) use the M applications (e.g., application 1 web server 408 through application M web server 410), non-financial and financial data is entered into each of the databases. As discussed above, users using an application (e.g., application 1 on application 1 web server 408) may enter non-financial data for the entity they represent or work for (e.g., profile data such as company name, address, phone number, etc.). Additionally, non-financial data is entered by users for each of the other P entities using application 1. Similarly, non-financial data is entered for each of the other entities using the M applications. Note that the same entity may be represented in the database of more than one application. Furthermore, as users use the applications, users may enter data for other entities such as customer data or vendor data.

During operation, processing apparatus 424 retrieves financial data for two or more entities from one or more of the M databases. In some embodiments, processing apparatus 424 may retrieve the data by querying one or more of the databases for the stored data and storing the retrieved data in a memory in processing apparatus 424. In some embodiments, processing apparatus 424 may retrieve financial data for all of the entities in each of the databases 412 to 418.

Using a process similar to that described above for processing apparatus 122, processing apparatus 424 then segments the retrieved data into its component signals for all of the data retrieved, and determines a distance between each component for each entity using a distance metric. This distance is then multiplied by a weighting factor to generate a likelihood matrix that any two entities are the same entity.

In some embodiments, after processing apparatus 424 retrieves the financial data from the databases, processing apparatus 424 may cluster the retrieved data by grouping together financial data for entities with non-financial data that meets certain distance or similarity requirements. For example, processing apparatus 424 may cluster together financial data for entities whose names are within a predetermined distance based on a string comparison of their names in the non-financial data. Processing apparatus 424 then analyzes the financial data components as described above for each entity within a cluster. Clustering the data may allow processing apparatus 424 to reduce the number of entity pairs that will be evaluated.

In some embodiments, processing apparatus 424 may implement the determination of a likelihood that two entities are the same entity using the following method: An entity a is determined by processing apparatus 424 to be the same or similar to another entity b with a likelihood (e.g., a probability score):

$$p(a|b), 0 \leq p(a|b) 0 \leq 1,$$

where: $p(a|b)=1$ if $a==b$, and
$p(a|b)=0$ if a and b are two completely different entities.

The probability score $p(a|b)$ may also be represented as a distance between entity a and entity b, where the probability is a weighted sum of the function of the different distance metrics for each of the components of the financial data, and in some embodiments, the non-financial data, for the two entities. This may be represented as:

$$p(a\,|\,b) = \sum_{k=1}^{m} w_k f_k(a\,|\,b)$$

where: $w_k$ is the weight of the $k^{th}$ component, and
$f_k(a|b)$ is the distance function of the $k^{th}$ component between a and b.

The weights $w_k$ are determined using a weighted distribution and may be found based on modeling or testing of actual data. The normalized distance function $f_k(a|b)$ may be determined as follows:

$$f_k = (a\,|\,b) = \frac{\sum_{i=1}^{n} \sigma_i d_i(a, b)}{n},$$

where: n is the number of data components being evaluated,
$d_i(a,b)$ is the distance between entity a and entity b computed using the distance metric for the $i^{th}$ component, and
$\sigma_i$ is a normalization constant.

The distances may be modeled as a Gaussian function:

$$G(a, b) = \frac{1}{\sigma\sqrt{2\pi}} e^{-\frac{d(a,b)^2}{2\sigma^2}}$$

and the normalization constant may be computed as:

$$\sigma = \sqrt{\frac{\sum_{i=0}^{n} d_i(a, b)^2}{n}}$$

Figure 5:
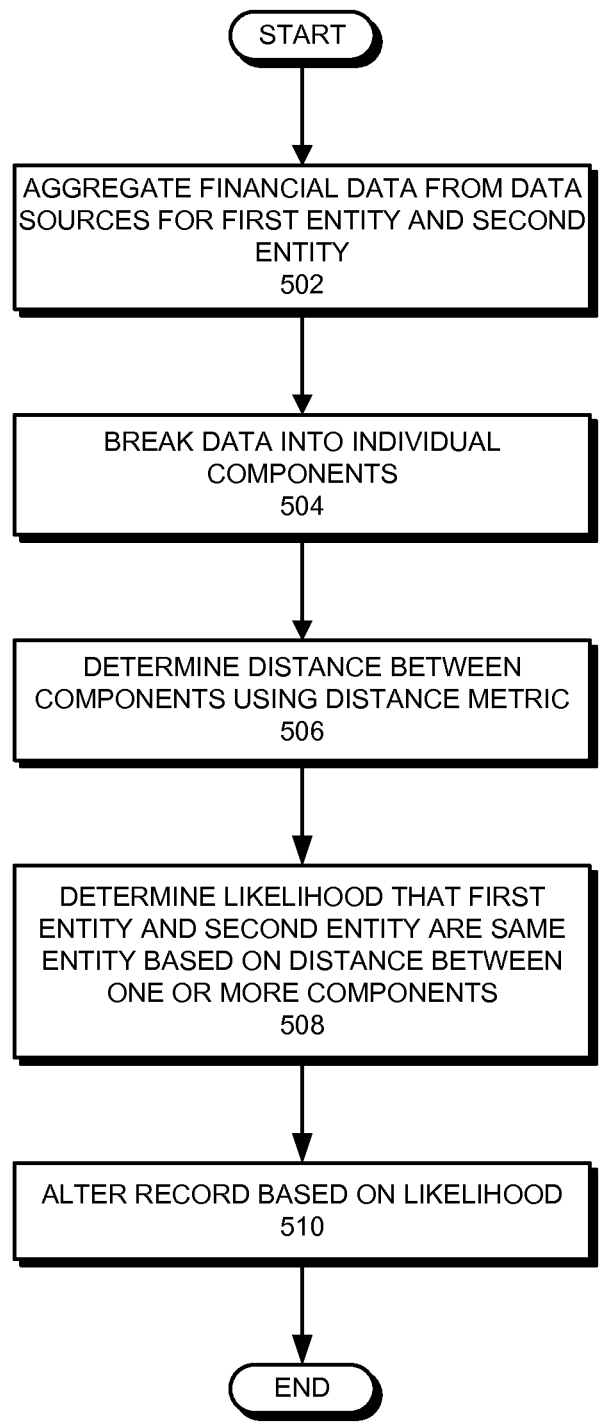
FIG. 5 shows a flowchart illustrating the process of determining a likelihood that a first entity and a second entity are the same entity in accordance with disclosed embodiments.

FIG. 5 shows a flowchart illustrating the process of determining a likelihood that a first entity and a second entity are the same entity in accordance with disclosed embodiments. The operations shown in FIG. 5 may be performed by a processing apparatus such as processing apparatus 122 or processing apparatus 424.

In step 502, a processing apparatus aggregates financial data for a first entity and a second entity from data sources. The data sources may include one or more databases, such as database 106, database 116, and database 412 through database 418. In embodiments in which there are more than two entities, the processing apparatus may aggregate financial data for more than two entities across all the data sources. Additionally, in some embodiments, the processing apparatus may further aggregate non-financial data from the data sources. In some embodiments, the aggregated data is stored in memory in the processing apparatus, while in other embodiments, the aggregated data is stored in memory that is not in the processing apparatus, but is accessible by the processing apparatus.

In step 504, the processing apparatus breaks the financial data into individual components as discussed above. For example, financial transactional data, such as customer transactions, may be broken up into price, customer location, customer industry, order frequency, etc. In some embodiments in which the processing apparatus aggregates financial data for more than two entities, the processing apparatus may also aggregate non-financial data for the entities and use the non-financial data to cluster the financial data based on one or more properties of the non-financial data. For example, the processing apparatus may cluster financial data for entities based on a determination of a string difference for names, addresses, or other non-financial data and then, as discussed below, separately analyze the financial data (and, additionally, in some embodiments the non-financial data) of entities in each cluster to determine if any two or more entities within a cluster are the same entity.

In step 506, the processing apparatus determines a distance between each component of the financial data for the two entities using a distance metric by implementing the process described above. In some embodiments in which more than two entities are being analyzed by the processing apparatus, the processing apparatus determines the distance between the components for each pair of entities.

Then, in step 508, the processing apparatus determines the likelihood that the first entity and the second entity are the same entity based on the distance between one or more of the components. In some embodiments, the processing apparatus may make this determination by multiplying each distance by a weight for the distance metric and summing as described above. The likelihood is then based on this sum. In some embodiments, the processing apparatus may additionally use weights and distances based on a distance metric for one or more components of the non-financial data for the entities in a cluster to determine if two entities are the same entity.

Then, in step 510, the processing apparatus alters or causes to be altered a record related to the first entity or the second entity based on the likelihood. In some embodiments, the processing apparatus may alter records including, but not limited to, the non-financial data for one or more entities (e.g., if the likelihood that they are the same entity is determined to be greater than a predetermined threshold). In some embodiments, the processing apparatus may alter records associated with marketing or sales information, for example, resulting in marketing and/or sales information being sent to or not sent to one or more of the entities. Additionally, the processing apparatus may use the likelihood determination to update records related to analyses of the interactions between entities, such as in a commerce graph of the transactions between entities using the applications.

Note that in some embodiments the same process may be used to determine the likelihood that two or more customers or vendors are the same entity. For example, financial data for vendors and/or customers may be clustered based on non-financial data of the customers or vendors (e.g., names, addresses, and/or phone numbers of customers and/or vendors); and the financial data (e.g., transactions, industry codes, radius of activity, etc.) for the customers and/or vendors may then be broken into components, and the same process described above may be used to determine the likelihood that two or more customers and/or vendors are the same.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method executed by processor circuitry for determining a likelihood that a first entity and a second entity are a same entity, the method comprising:
    retrieving, from a first database, a first data related to the first entity and retrieving, from a second database, a second data related to the second entity;
    segmenting the retrieved first data into a first set of individual components;
    segmenting the retrieved second data into a second set of individual components, wherein each component in the first set of individual components corresponds to a component in the second set of individual components;
    determining a characteristic value for each component in the first and second sets of individual components;
    determining, for each component in the first set of individual components, a distance value based on a distance of the determined characteristic value of the component from the determined characteristic value of the corresponding component in the second set of individual components;
    determining the likelihood that the first entity and the second entity are the same entity based on the determined distance values; and
    altering a record related to the first entity or the second entity upon determining the likelihood is greater than or equal to a first likelihood; and adding a second record from the first data related to the first entity to the second data related to the second entity if the likelihood is greater than or equal to a second likelihood.

2. The computer-implemented method of claim 1, wherein the first data and second data include financial transactional data.

3. The computer-implemented method of claim 2, wherein the financial transactional data includes at least one of:
    an industry category;
    a radius of activity;
    a vendor industry category;
    a set of vendor names;
    a set of customer names;
    an average transaction size;
    an average vendor size;
    an average customer size;
    an inventory;
    a debit;
    a credit;
    an account payable; and
    an account receivable.

4. The computer-implemented method of claim 1, wherein the determined distance values are based on distance metrics.

5. The computer-implemented method of claim 1, wherein the likelihood is further determined based on a weight for each distance.

6. The computer-implemented method of claim 1, wherein retrieving the first data includes retrieving financial data related to the first entity from financial data associated with a first online application, and retrieving the second data includes retrieving financial data related to the second entity from financial data associated with a second online application.

7. The computer-implemented method of claim 1 wherein retrieving the first data includes retrieving non-financial data related to the first entity, and retrieving the second data includes retrieving non-financial data related to the second entity.

8. A system for determining a likelihood that a first entity and a second entity are a same entity, comprising:
    processing circuitry configured to:
        retrieve, from a first database, a first data related to the first entity and retrieve, from a second database, a second data related to the second entity;
        segment the retrieved first data into a first set of individual components;
        segment the retrieved second data into a second set of individual components, wherein each component in the first set of individual components corresponds to a component in the second set of individual components;
        determine a characteristic value for each component in the first and second sets of individual components;
        determine, for each component in the first set of individual components, a distance value based on a distance of the determined characteristic value of the component from the determined characteristic value of the corresponding component in the second set of individual components;
        determine the likelihood that the first entity and the second entity are the same entity based on the determined distance values; and
        alter a record related to the first entity or the second entity upon determining the likelihood is greater than or equal to a first likelihood; and add a second record from the first data related to the first entity to the second data related to the second entity if the likelihood is greater than or equal to a second likelihood.

9. The system of claim 8, wherein the first data and second data include financial transactional data.

10. The system of claim 9, wherein the financial transactional data includes at least one of:
    an industry category;
    a radius of activity;
    a vendor industry category;
    a set of vendor names;
    a set of customer names;
    an average transaction size;
    an inventory;
    an average vendor size;
    an average customer size;
    a debit;
    a credit;
    an account payable; and
    an account receivable.

11. The system of claim 8, wherein the processing apparatus is configured to determine the distance value based on a distance metric.

12. The system of claim 8, wherein the processing apparatus is configured to determine the likelihood based on a weight for each distance.

13. The system of claim 8, wherein the processing apparatus is configured to retrieve the first data by retrieving financial data related to the first entity from a first online application, and retrieving financial data related to the second entity by retrieving the financial data related to the second entity from a second online application.

14. The system of claim 8, wherein the processing apparatus is further configured to:

retrieve the first data by retrieving non-financial data related to the first entity and retrieve the second data by retrieving non-financial data related to the second entity.

15. A non transitory computer-readable storage medium storing instructions that when executed by a computer cause processing circuitry to perform a method for determining a likelihood that a first entity and a second entity are a same entity, the method comprising:

retrieving, from a first database, a first data related to the first entity and retrieving, from a second database, a second data related to the second entity;

segmenting the retrieved first data into a first set of individual components;

segmenting the retrieved second data into a second set of individual components, wherein each component in the first set of individual components corresponds to a component in the second set of individual components;

determining a characteristic value for each component in the first and second sets of individual components;

determining, for each component in the first set of individual components, a distance value based on a distance of the determined characteristic value of the component from the determined characteristic value of the corresponding component in the second set of individual components;

determining the likelihood that the first entity and the second entity are the same entity based on the determined distance values; and altering a record related to the first entity or the second entity upon determining the likelihood is greater than or equal to a first likelihood; and adding a second record from the first data related to the first entity to the second data related to the second entity if the likelihood is greater than or equal to a second likelihood.

16. The non transitory computer-readable storage medium of claim 15, wherein the first and second data includes financial transactional data, wherein the financial transactional data includes at least one of:
an industry category;
a radius of activity;
a vendor industry category;
a set of vendor names;
a set of customer names;
an average transaction size;
an inventory;
an average vendor size;
an average customer size;
a debit;
a credit;
an account payable; and
an account receivable.

17. The non transitory computer-readable storage medium of claim 15, wherein the determined distance values are based on distance metrics.

18. The non transitory computer-readable storage medium of claim 15, wherein retrieving the first data includes retrieving financial data related to the first entity from a first online application, and retrieving the second data includes retrieving financial data related to the second entity from a second online application.

19. The non transitory computer-readable storage medium of claim 15 wherein retrieving the first data includes retrieving non-financial data related to the first entity, and retrieving the second data includes retrieving non-financial data related to the second entity.

* * * * *